April 23, 1957  J. B. BIDWELL  2,789,429
SURFACE GAGE EXTENSION PROBE
Filed April 28, 1954
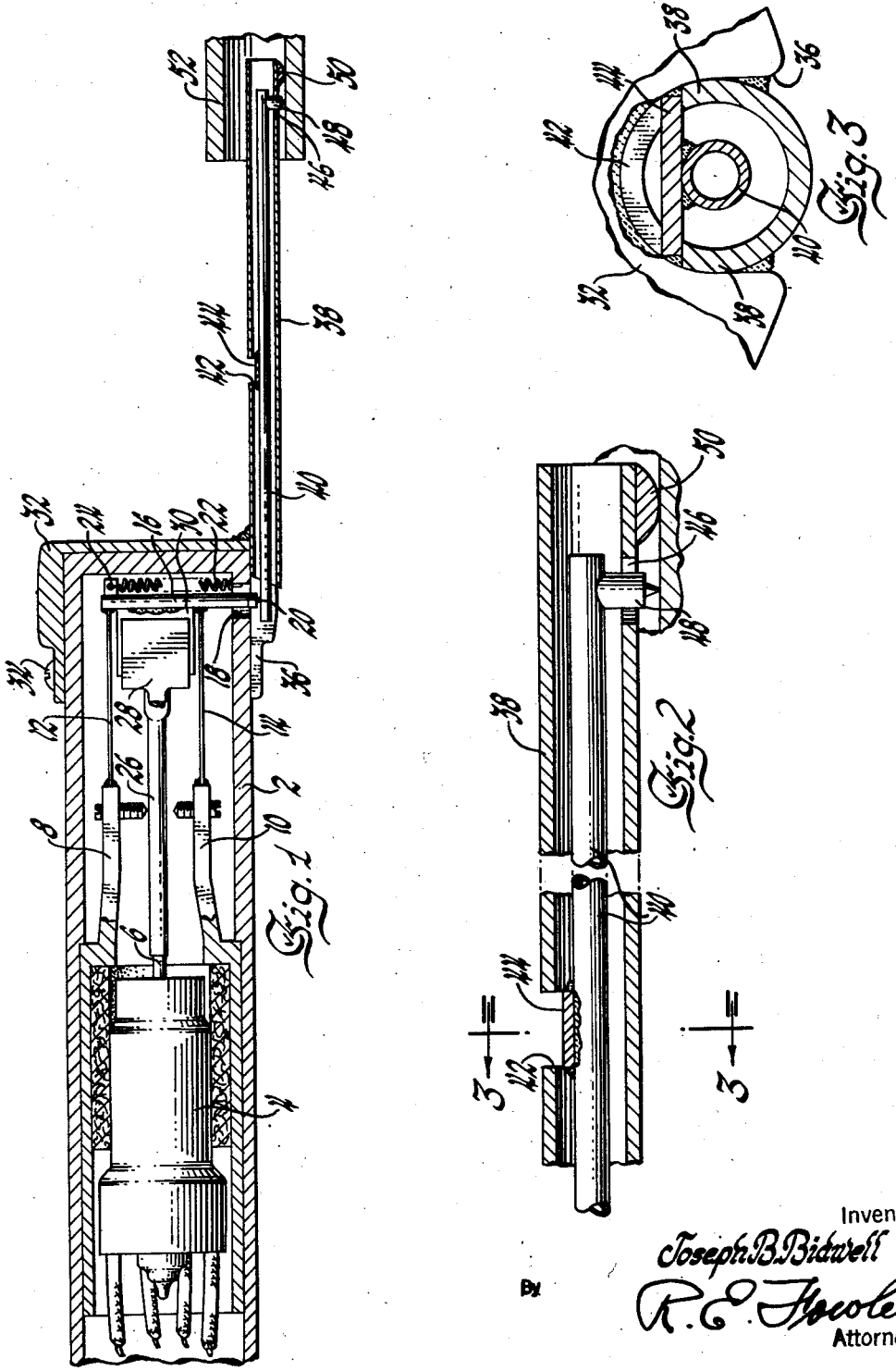
Inventor
Joseph B. Bidwell
By R. E. Fowler
Attorney

United States Patent Office 2,789,429
Patented Apr. 23, 1957

2,789,429

SURFACE GAGE EXTENSION PROBE

Joseph B. Bidwell, Royal Oak, Mich., assignor to General Motors Corporation, Detroit, Mich., a corporation of Delaware Application April 28, 1954, Serial No. 426,180

3 Claims. (Cl. 73—105)

This invention relates to an adaptor or extension means for transmitting motion from a desired locality to utilization means.

In testing or measuring means the apparatus applicable to the device or surface under inspection has certain bulk and mass which prevents access to limited areas. As exemplary, surface smoothness measuring means which is moved over a surface to be measured consists of a housing and a stylus projecting from an opening in one side. While the housing is relatively small, the gage cannot be moved into small diameter openings where it is often desired to measure smoothness such as in bushings or bearings.

It is therefore an object in making this invention to provide an extension for gaging apparatus to permit access into small openings.

It is a further object in making this invention to provide an adaptor for measuring means which will extend into small openings for obtaining readings.

It is a further object in making this invention to provide an extension probe for surface smoothness measuring means.

With these and other objects in view which will become apparent as the specification proceeds, my invention will be best understood by reference to the following specification and claims and the illustrations in the accompanying drawings, in which:

Figure 1 is a vertical sectional view through a gage and adaptor applied thereto;

Figure 2 is an enlarged vertical sectional view of the extension alone, parts being broken away; and Figure 3 is a further enlarged sectional view taken on the line 3—3 of Figure 2.

Referring now more particularly to the drawings, 2 designates the casing of a gage for indicating surface smoothness within which is mounted an electron tube 4 which has an extension 6 extending from the head which supports an electrode within the tube. Movement of the extension 6 varies the conductance of the tube.

Two substantially rigid arms 8 and 10 within the casing 2 lie parallel to the axis of said casing and support in parallel spaced relation two flexible reed members 12 and 14. The reeds 12 and 14 are rigidly secured to a vertical stylus holder 16 which projects through an opening 18 in the side of the casing. Thus the stylus holder is resiliently supported. A stylus 20 for movement over a surface to be gaged is mounted in the end of the stylus holder 16. The stylus holder is biased to force the stylus toward the work by a spring 22, one end of which is secured to the casing adjacent opening 18, and the other end to an ear 24 extending from the upper end of the stylus holder. The motion of the stylus is transmitted to the tube extension 6 through a rod 26 which fits over the extension 6, and a viscous coupler consisting of parallel plates 28 secured to the end of rod 26 and plate 30 secured to the stylus holder 16 and mounted between plates 28. A layer of fluid of the proper viscosity held between the plates provides a low pass filter coupler. The construction of the gage to this point forms no part of the present invention and is fully described in copending applications Serial No. 246,853, John H. Brems and Joseph B. Bidwell, filed September 15, 1951, and Serial No. 276,770, John H. Brems, filed March 15, 1952, which issued as Patent 2,703,007 on March 1, 1955.

Although the physical size of the casing is not large, it cannot be moved into smaller openings, such as in bushings and bearings where it is desired to measure the surface smoothness. A detachable cap 32, which fits over the end of the casing 2 may be secured thereto by any suitable means such as cap screws 34. The cap has a slot 36 in one side through which the stylus slides as the cap is applied to the casing. A cylindrical tubular member 38 is fixedly secured in the end of the slot nearest the head of the cap by soldering or welding, and extends out for a considerable distance to form a housing and support for an extension tracer lever 40 for insertion into openings to gage the inner surfaces of members. The tracer lever 40 is supported within the housing 38 for pivotal movement about a point intermediate its length. A transverse slot 42 of appreciable width is cut in the top of the tube 38. A transverse flexible spring member 44 of the width of the slot is secured across the slot by welding or soldering, and the lever 40 is fixedly secured to the underside of said spring member 44, as best shown in Figure 3. This member 44 will be stiff laterally but is flexible in torsion and will twist to permit lever 40 to pivot about its center. One end of the lever 40 extends beyond the tube 38 and bears against the end of the stylus 20 when the cap 32 is in position. An opening 46 is provided in the side of the tubular member 38 adjacent the other or outer end and a stylus 48 rigidly secured to the other end of the lever 40 is adapted to project through the opening 46 to engage a surface to be inspected. A rider or skid 50 is fastened to the outer face of the tubular member 38 adjacent the stylus 48. The outer end of the tubular extension 38 can be inserted within members such as bushing 52 for testing.

The distance from the stylus 48 to the pivot supplied by flexible member 44 is equal to that from the contact between lever 40 and stylus 20 to the same pivot point. This gives a 1–1 lever system with no multiplication of movement but, however, with a reversal of phase. This does not make any difference, inasmuch as the gage is not direction conscious and will read the same amount for equal deflections in opposite directions.

It will thus be evident that I have provided a quickly attachable adaptor to permit gaging within small apertures.

I claim:

1. In a measuring device, a casing, a stylus resiliently mounted in the casing and projecting through an opening therein to contact a surface to be measured, variable electrically conductive means mechanically connected to the stylus and varied by movement of the latter, an extension tubular member of small diameter secured to the casing, a flat flexible ribbon secured transversely in said member, an arm pivotally mounted on said ribbon within the member and having one end bearing against the stylus and a second stylus rigidly secured to the opposite end of the arm and projecting through an opening in the side of the tubular member to engage a surface within a confined area to be measured.

2. An adaptor to provide access into small apertures for a surface smoothness gage having a stylus projecting from a wall of said gage comprising an elongated hollow member of small diameter having one end secured to the gage adjacent the stylus and having a slot cut across its surface between its ends, a flat flexible ribbon secured in said slot, a rod secured to said ribbon and thus pivotally mounted in said hollow member and having one end bearing against the end of the stylus, and a second stylus rigidly secured to the outer end of the rod and projecting through an opening in the hollow member to engage an inner surface of a relatively small aperture.

3. An adaptor for surface smoothness gaging means having a stylus projecting from an opening in the wall of a casing, comprising a hollow tubular member of small diameter having one end secured to said casing adjacent the end of the stylus and having a slot cut across its upper surface substantially midway between its ends, a flat flexible ribbon secured in the slot, a rod of smaller diameter than the inner diameter of the tubular member secured within the member at its midpoint to the ribbon which provides a pivot therefor, said one end of the rod projecting beyond the tubular member and engaging the stylus, a second stylus rigidly secured to the outer end of the rod and projecting through an opening in the tubular member, and a skid secured to the outer surface of the tubular member adjacent the second stylus so that as the end of the tubular member is inserted in an opening the second stylus is moved over a surface to be gaged and movement of the stylus is transmitted through pivotal movement of the rod to the first-named stylus for operating the gage.

References Cited in the file of this patent

UNITED STATES PATENTS

| | | |
|---|---|---|
| 299,757 | Du Brul | June 3, 1884 |
| 2,016,659 | Tydeman | Oct. 8, 1935 |
| 2,122,664 | Terry | July 5, 1938 |
| 2,345,022 | Williamson | Mar. 28, 1944 |